Dec. 4, 1951 L. M. BELLEVILLE 2,577,506
AMPLIFIER
Filed July 9, 1945
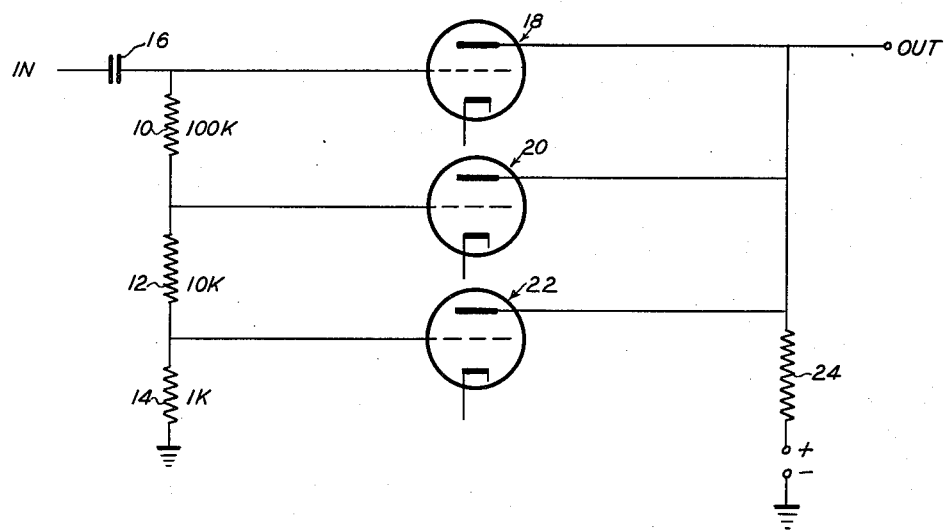
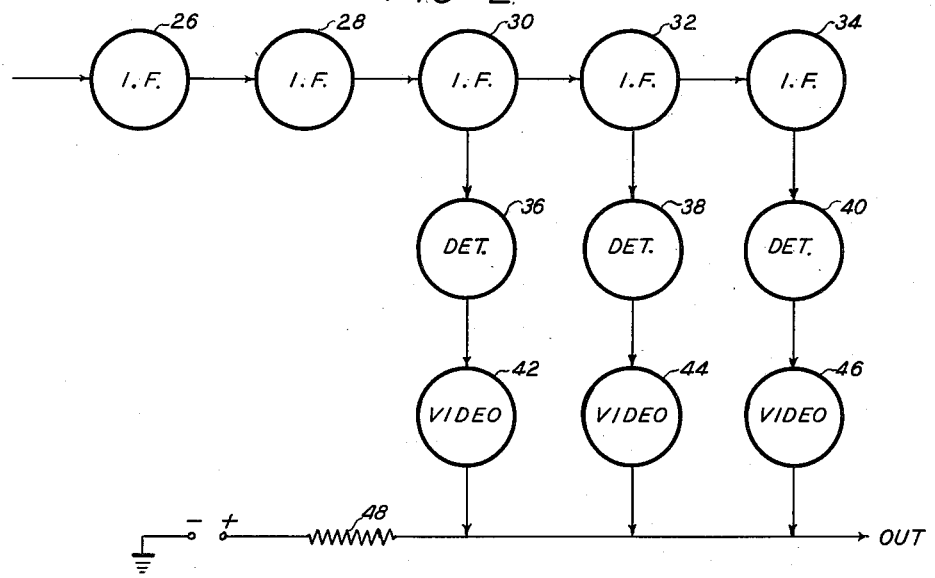
INVENTOR.
LOGAN M. BELLEVILLE
BY
William D. Hall
Attorney Patented Dec. 4, 1951

2,577,506

UNITED STATES PATENT OFFICE 2,577,506

AMPLIFIER

Logan M. Belleville, Watertown, Mass., assignor, by mesne assignments, to the United States of America as represented by the Secretary of War Application July 9, 1945, Serial No. 604,035

7 Claims. (Cl. 250—20)

The present invention relates in general to electronic circuits and more specifically to an electronic network whose output voltage is proportional to the logarithm of its input voltage.

In some applications of electronic apparatus, it is highly desirable to facilitate operation by providing an electronic network whose output does not vary linearly with the input voltage, but rather as the logarithm of the input voltage. One of the objects of the present invention, therefore, is to provide an electronic network whose operating characteristics satisfy this requirement.

For some types of cathode ray apparatus numerous advantages are obtained by utilizing a logarithmic output for accomplishing particular types of scanning. Accordingly, it is another object of my invention to provide circuits for transforming an input signal into an output signal whose value is substantially proportional to the logarithm of the input signal, so that it may be utilized in connection with cathode-ray oscilloscopes with some inherent advantages obtained due to such transformation.

In general my invention contemplates dividing or transforming an input voltage into a series of voltages bearing a predetermined relationship with respect to each other, and utilizing each of these voltages to control thermionic apparatus to obtain an output logarithmically related with respect to the input voltage. The logarithmic output signal is obtained by combining at least a portion of the outputs of the controlled thermionic apparatus in a common output circuit.

For a better understanding of the invention, together with other and further objects thereof, reference is had to the following description taken in connection with the accompanying drawings, in which:

Fig. 1 is one embodiment of my invention; and

Fig. 2 is a schematic diagram illustrating a block diagram an alternate form of my invention.

Referring now more particularly to Fig. 1, serially connected resistances 10, 12, and 14, which by way of example may be in the ratio of 100:10:1, make up a voltage divider or a potentiometer across which the total input voltage is applied through capacitor 16. The total input voltage is also applied to the grid of vacuum tube 18 whose input circuit is thus connected across the entire potentiometer. The voltage at the terminal point between resistors 10 and 12 is applied to the grid of tube 20 and as can be seen from the values of the resistors in the example shown, this amounts to about one-tenth of the input voltage. The voltage at the terminal point between resistors 12 and 14 is applied to the grid of vacuum tube 22, and in the same example this can be seen to be approximately one-hundredth of the total input voltage. Tubes 18, 20, and 22 have a common load resistor 24, across which the outputs of the tubes are combined simultaneously, the total output voltage being a result of the sum of the three tube currents flowing through resistor 24.

Describing now the operation of the system of Fig. 1, an input signal is received and attenuated by the voltage divider as previously explained. Thus if tube 18 receives a 10 volt signal, tube 20 receives 1 volt, and tube 22 receives 1/10 volt. The tubes are so chosen that they will saturate at some predetermined point, and only when a tube saturates does the output of the tube receiving the next smaller input become significant. For example, suppose tube 18 saturates when the input is 1 volt. Then, assuming the amplification of each stage to be 10, the output will be approximately 10 volts. In order to saturate tube 20, the input voltage must be 10 volts, if the tubes are identical, due to the step-down ratio of the voltage divider. At this time the output will be 20 volts, the sum of the maximum outputs of tubes 18 and 20. The output from tube 22 at this time is still negligible. Similarly, the input voltage must reach 100 volts before tube 22 saturates, and the output then would be 30 volts, the sum of the maximum outputs of the three tubes. Thus we have an output proportional to the logarithm of the input, and, as can be seen, the base of the logarithm is determined by the ratio of the elements of the voltage divider.

Referring next to Fig. 2, we have a block diagram of a portion of a radio receiving system employing a slightly different form of the invention. The I. F. input is fed through two conventional I. F. amplification stages, 26 and 28 to a second series of serially connected I. F. amplifiers, 30, 32, and 34. The output of amplifier 30 is fed to a detector 36, as well as to the succeeding I. F. stage, and the output of amplifier 32 is divided in the same way, being fed both to detector 38 and I. F. amplifier 34. The output of amplifier 34 goes to a detector 40. If we so choose, the last three I. F. stages may each have, by way of example, an amplification of 10; thus, it can be seen that they will form, in this case, the equivalent of the voltage divider of Fig. 1, the three I. F. output voltages being again in the ratio of 100:10:1. The outputs of the three detectors therefore develops three corresponding signal voltages in the ratio 100:10:1 which are fed to three separate video amplifiers 42, 44, and 46, the outputs of which are combined through a common load resistor 48 in the same manner as in the apparatus of Fig. 1. By analogous performance the output signal of this receiver will be proportional to the logarithm of the amplitude of I. F. input and the base of the logarithm system will be determined by the gain of these last three I. F. stages.

It will be noted that in the Fig. 2 arrangement and example a small signal output from I. F. amplifier 28 is multiplied by a factor 10 in each of the successive stages 30, 32 and 34 to provide a corresponding plurality of inputs, to detectors 36, 38 and 40. In the arrangement and example of Fig. 1 a large signal which is applied across the series connected impedances 10, 12 and 14 is divided by a factor of 10 to provide a corresponding plurality of inputs to the grids of amplifier tubes 18, 20 and 22. It is evident that the inputs to amplifiers 18, 20 and 22 of Fig. 1 respectively correspond to the inputs to detectors 40, 38 and 36 of Fig. 2. In both examples the arrangement is adapted to provide a plurality of similar signals at a corresponding plurality of terminals, the values of said signals being related substantially in geometric progressive order, the ratio of the amplitudes of successive signals in the progression having a chosen value corresponding to a desired logarithmic base which in both examples was taken as 10.

In both arrangements and examples a corresponding plurality of translating devices are operatively connected with said terminals, each of said devices having similar characteristics and adapted to repeat the signal amplitudes between predetermined amplitude levels. In both arrangements there is a common output circuit for the device.

It will be obvious that the examples given in Fig. 1 and Fig. 2 are illustrative only, and that many other variations, including changes in number and magnitude of circuit elements, are possible while remaining within the scope of the invention.

The invention thus discloses an electrical circuit for transforming an input signal into an output signal which is substantially proportional to the logarithm of the input signal, the circuit including any suitable electrical means, such as a potentiometer illustrated in Fig. 1 or a plurality of cascade-connected amplifiers illustrated in Fig. 2, for transforming the input signal into a plurality of signals whose respective values are proportional to a geometric progression, and a corresponding plurality of saturable electrical networks having their input circuits connected to the respective terminals of said means. These networks, in Fig. 1, correspond to the parallelly-connected amplifiers 18, 20, and 22, while in Fig. 2 they correspond to the detectors 36, 38, and 40 and video amplifiers 42, 44, and 46. These networks reach successive current saturations at a common voltage with respect to ground, since the cathodes of the amplifiers, such as amplifiers 18, 20, and 22, are normally connected to ground. The same is true of the detectors 36, 38, and 40 in Fig. 2. However, the conductivity of these amplifiers is varied in response to any increase in the input voltage across the previously mentioned input means, which is obtained by proportioning the impedances, such as resistances 10, 12, and 14 in Fig. 1 or the gains of the amplifiers 30, 32, and 34 in Fig. 2, so that the input signal is transformed into a plurality of signals having geometric progression relationship with respect to each other. The logarithm output is then obtained by combining the output of the parallel paths in one, common output circuit for all the networks.

While there have been described two embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What I claim is:

1. An electrical circuit for transforming an input signal into an output signal substantially proportional to the logarithm of said input signal comprising a source of said input signal, means connected to said source and having a plurality of terminals, said means producing, at said terminals, a corresponding plurality of successively smaller signals whose respective values are substantially proportional to a geometric progression having a quotient which is less than unity, said producing means comprising signal translating elements connected in an operative series, the translation of the signal by each of said elements being dependent upon the translation by the respective preceding element; a corresponding plurality of saturable electrical networks having their input circuits connected to the respective terminals of said means, said networks reaching successive current saturations at a common voltage with respect to ground but in response to an increase in the input voltage across said means in the manner of geometric progression, and a common load circuit in parallel with the output circuits of all of said networks.

2. An electrical circuit for transforming an input signal into an output signal substantially proportional to the logarithm of said input signal comprising means for transforming said input signal into a plurality of successively smaller signals whose values are substantially proportional to a geometric progression having a quotient which is less than unity at a corresponding plurality of terminals on said means, said transforming means comprising signal translating elements connected in an operative series, the translation of the signal by each of said elements being dependent upon the translation by the respective preceding element; a corresponding plurality of saturable electrical networks having their input circuits connected to the respective terminals of said means, said networks reaching respective successive saturations at a common voltage with respect to a common point of reference potential on said means in response to an increase of said input signal when the input voltage is increased in the manner of said geometric progression, and a common load circuit in parallel with the output circuits of all of said networks.

3. An electrical circuit for transforming an input signal into an output signal substantially proportional to the logarithm of said input signal comprising a potentiometer including a plurality of terminals having output voltages substantially proportional to a geometric progression, a plurality of amplifiers connected to said potentiometer, the number of said amplifiers corresponding to the number of said terminals, each of said amplifiers having an input circuit and being saturable at a common voltage with respect to a common point of reference potential on said potentiometer and in response to an increase in said input signal, the input circuit of one amplifier being connected across said potentiometer, and the inputs of the remaining amplifiers being connected respectively to the remaining successive terminals of said potentiometer, and a common output circuit interconnecting all of said amplifiers.

4. A receiver comprising a plurality of cascade-connected intermediate frequency amplifiers whose respective output voltages are substantially proportional to a geometric progression, a plurality of parallelly connected detectors, the number of said detectors being equal to the number of said intermediate-frequency amplifiers, the respective input circuits of said detectors being connected to the corresponding outputs of said intermediate-frequency amplifiers, a plurality of video amplifiers, the number of said video amplifiers being equal to the number of said detectors, the respective input circuits of said video amplifiers being connected to the corresponding output circuits of said detectors, whereby said intermediate-frequency amplifiers, detectors, and video amplifiers form a plurality of parallelly connected channels, and a common load circuit in parallel with the output circuits of all of said video amplifiers.

5. An electrical circuit for transforming an input circuit signal into an output signal substantially proportional to the logarithm of the amplitude of said input signal to a chosen base comprising means for transforming said input signal into a plurality of similar signals at a corresponding plurality of terminals, said transforming means being comprised of a plurality of cascade operable elements, one disposed between corresponding ones of said terminals, said similar signals having amplitudes which are related substantially in a geometric progressive order having a quotient less than unity, the ratio of the amplitudes of successive signals in the progression and the operative characteristics of said elements having a chosen value corresponding to a desired logarithmic base, a corresponding plurality of translating devices saturable at a common voltage with respect to a common point of reference potential on said means and in response to an increase of said input signal and operatively connected with said terminals to repeat said signals between predetermined amplitude levels and a common load circuit in parallel with the output circuits of all said devices.

6. An electrical circuit for transforming an input signal into an output signal substantially proportional to the logarithm of the amplitude of said input signal to a chosen base comprising a potentiometer signal dividing means for transforming said input signal into a plurality of similar signals at a corresponding plurality of terminals, said potentiometer having portions and said similar signals having amplitudes which are related substantially in a geometric progressive order having a quotient which is less than unity, the ratio of the potentiometer portions and of the amplitudes of successive signals in the progression having a chosen value corresponding to a desired logarithmic base, a corresponding plurality of electronic translating devices having input elements operatively connected with said terminals to repeat said signals similarly between predetermined amplitude levels being saturable at a common voltage with respect to a common point of reference potential on said potentiometer and in response to an increase of said input signal, and a common output circuit for all said devices.

7. An electrical circuit for transforming a modulated carrier wave input signal into an output signal substantially proportional to the logarithm of the modulation amplitude of said input signal to a chosen base comprising amplifier means having a plurality of subsidiary cascade-connected operative subsidiary portions for transforming said input signal into a plurality of similar signals at a corresponding plurality of terminals, said portions having operative characteristics and said similar signals having amplitudes which are related substantially in a geometric progressive order having a quotient which is less than unity, the operative ratio of said portions and the ratio of the values of successive signals in the progression having a chosen value corresponding to a desired logarithmic base, a corresponding plurality of translating devices operatively connected with said terminals to detect the modulation of said similar signals and to repeat said modulation between predetermined amplitude levels being saturable at a common voltage with respect to a common point of reference potential on said transforming means and in response to an increase of said input signal and a common load circuit in parallel with the output circuits of all said devices.

LOGAN M. BELLEVILLE.

REFERENCES CITED

The following references are of record in the file of this patent:

UNITED STATES PATENTS

| Number | Name | Date |
|---|---|---|
| 1,315,539 | Carson | Sept. 9, 1919 |
| 1,401,644 | Rice | Dec. 27, 1921 |
| 1,477,017 | Sprague | Dec. 11, 1923 |
| 1,477,899 | Rice | Dec. 18, 1923 |
| 1,986,597 | Nyman | Jan. 1, 1935 |
| 2,014,509 | Roosenstein et al. | Sept. 17, 1935 |
| 2,031,072 | Roosenstein | Feb. 18, 1936 |
| 2,041,245 | Haffcke | May 19, 1936 |
| 2,269,011 | Dallow | Jan. 6, 1942 |
| 2,515,187 | Bliss | July 18, 1950 |

OTHER REFERENCES

A. R. R. L. Handbook, 1942, page 27.

Terman: "Radio Engineers' Handbook," McGraw-Hill, 1943, page 622.